(12) United States Patent
Daware et al.

(10) Patent No.: US 11,488,226 B2
(45) Date of Patent: Nov. 1, 2022

(54) METHOD AND SYSTEM FOR DESIGNING FORMULATED PRODUCTS

(71) Applicant: Tata Consultancy Services Limited, Mumbai (IN)

(72) Inventors: Santosh Vasant Daware, Pune (IN); Rinu Chako, Pune (IN); Deepak Shyamsunder Jain, Pune (IN); Shankar Balajirao Kausley, Pune (IN); Shally Gupta, Pune (IN); Pallavi Bandi, Pune (IN); Dharmendr Kumar, Pune (IN); Beena Rai, Pune (IN); Amit Bhowmik, Mumbai (IN); Umesh Singh, Pune (IN); Chetan Premkumar Malhotra, Pune (IN); Purushottham Gautham Basavarsu, Pune (IN)

(73) Assignee: Tata Consultancy Limited Services, Mumbai (IN)

( * ) Notice: Subject to any disclaimer, the term of this patent is extended or adjusted under 35 U.S.C. 154(b) by 216 days.

(21) Appl. No.: 16/909,845

(22) Filed: Jun. 23, 2020

(65) Prior Publication Data
US 2020/0401917 A1    Dec. 24, 2020

(30) Foreign Application Priority Data

Jun. 24, 2019    (IN) .............................. 201921025038

(51) Int. Cl.
*G06Q 30/06* (2012.01)
*G06K 9/62* (2022.01)
(Continued)

(52) U.S. Cl.
CPC ....... *G06Q 30/0631* (2013.01); *G06F 16/242* (2019.01); *G06F 16/2453* (2019.01);
(Continued)

(58) Field of Classification Search
CPC ........... G06Q 30/0631; G06Q 30/0283; G06Q 30/0621; G06F 16/242; G06F 16/2453;
(Continued)

(56) References Cited

U.S. PATENT DOCUMENTS 6,757,667 B1    6/2004 Patel
9,971,766 B2    5/2018 Pasupalak et al.
(Continued)

FOREIGN PATENT DOCUMENTS

IN    201821014473    10/2019
WO   WO-2019/148116    8/2019

OTHER PUBLICATIONS

Zhang, L. et al. (Dec. 2017). "An integrated framework for designing formulated products," *Computers and Chemical Engineering*, vol. 107; pp. 61-76.

*Primary Examiner* — Neil R McLean
(74) *Attorney, Agent, or Firm* — Finnegan, Henderson, Farabow, Garrett & Dunner, L.L.P.

(57) ABSTRACT

This disclosure relates generally to method and system for designing the formulated products. Conventional techniques for designing the formulated products, meeting final functional properties, are limited. Further, understanding user requirements and active incorporation of the user requirements during design phase is quite challenging. The present disclosure herein provides method and system that solve the technical problem of extracting the functional requirement by establishing continuous conversation with the user. An optimal prediction function for each functional requirement is determined by using a plurality of prediction models. An optimization technique along with an objective function is employed to determine optimized solutions comprising list of ingredients, possible concentration level of each ingredient, the process parameters, and the operating parameters for obtaining the desired formulation based on the user requirement.

11 Claims, 5 Drawing Sheets

(51) Int. Cl.
    *G06N 5/00*      (2006.01)
    *G06Q 30/02*     (2012.01)
    *G06F 16/2453*   (2019.01)
    *G06F 16/242*    (2019.01)

(52) U.S. Cl.
    CPC ............ *G06K 9/6256* (2013.01); *G06N 5/00* (2013.01); *G06Q 30/0283* (2013.01); *G06Q 30/0621* (2013.01); *Y10S 707/912* (2013.01); *Y10S 707/948* (2013.01); *Y10S 707/99931* (2013.01); *Y10S 707/99933* (2013.01)

(58) Field of Classification Search
    CPC .......... G06K 9/6256; G06N 5/00; G06N 5/04; G06N 20/20; Y10S 707/912; Y10S 707/948; Y10S 707/99931; Y10S 707/99933
    USPC .......................................................... 706/12
    See application file for complete search history.

(56) References Cited

U.S. PATENT DOCUMENTS

| | | | | |
|---|---|---|---|---|
| 10,847,265 | B2* | 11/2020 | Kannan | G16H 30/40 |
| 2005/0021174 | A1* | 1/2005 | Wilmott | A61K 8/737 |
| | | | | 700/239 |
| 2019/0237194 | A1* | 8/2019 | Salvi | G16H 30/40 |

* cited by examiner

METHOD AND SYSTEM FOR DESIGNING FORMULATED PRODUCTS

PRIORITY CLAIM

This U.S. patent application claims priority under 35 U.S.C. § 119 to: Indian Patent Application No. 201921025038, filed on 24 Jun. 2019. The entire contents of the aforementioned application are incorporated herein by reference.

TECHNICAL FIELD

The present disclosure herein generally relates to the field of formulated products, and, more particularly, to method and system for designing the formulated products.

BACKGROUND

Formulated products such as personal care, detergents, paints, lubricants, pharmaceutical products and so on are used ubiquitously in everyday life. Each formulated product has a unique and complex formulation comprising of a mixture of ingredients. The ingredients may add functional attributes as well as sensorial attributes to such formulated products. Desired properties of the formulated products are very difficult to predict in priory.

Conventional design techniques for making the formulations meeting the functional and sensorial attributes of the formulated products, are limited. Lab-based trial and error methodologies are traditionally followed for designing the new formulations or modifying existing formulations to make the desired formulated products. However, the conventional traditional methodologies are labor intensive and time consuming.

Furthermore, customized or personalized formulations based on user requirements, are key to market innovation in terms of uniqueness. Understanding the user requirements and active incorporation of the user requirements during design phase of the formulated products itself are very essential to ensure satisfaction from the user. However, the techniques to effectively capture, analyze and assimilate the user requirements and mapping the user requirement to extract functional requirements are limited and making such techniques and related tools are quite challenging. Also, the mapping process is afflicted with various challenges including differences in semantics, interpretation of terminologies and abstract articulation of the user. Hence, understanding underlying effects of the user requirements and transferring the user requirements to extract the functional requirements are always challenging and areas of improvement in designing the customized or personalized formulations.

SUMMARY

Embodiments of the present disclosure present technological improvements as solutions to one or more of the above-mentioned technical problems recognized by the inventors in conventional systems.

For example, in an aspect, a method for designing the formulated products is provided. The method includes receiving an intent associated with a desired formulation of a target formulated product, from a user; extracting one or more functional parameters and one or more performance indicators of the desired formulation, based on the received intent; obtaining a quantitative value for each functional parameter of the one or more functional parameters, using a conversion look-up table; identifying one or more key input parameters associated with the one or more functional parameters of the desired formulation, based on the one or more performance indicators, wherein the one or more key input parameters include (i) one or more process parameters, (ii) one or more operating condition parameters, (iii) one or more ingredients, and (iv) one or more parameters associated with the one or more ingredients; determining an optimal prediction model for each functional parameter of the one or more functional parameters, to obtain an optimal prediction function for the associated functional parameter; and determining an optimal solution dataset of the one or more key input parameters associated with the one or more functional parameters for the desired formulation, using an optimization technique, based on an objective function, and one or more constraints comprising (i) the quantitative value for each functional parameter of the one or more functional parameters, (ii) lower bound values and upper bound values of the one or more key input parameters, and (iii) the one or more performance indicators, wherein the objective function is defined as a weighted sum of the optimal prediction function for each functional parameter of the one or more functional parameters.

In another aspect, a system for designing the formulated products is provided. The system includes a memory storing instructions; one or more Input/Output (I/O) interfaces; and one or more hardware processors coupled to the memory via the one or more I/O interfaces, wherein the one or more hardware processors are configured by the instructions to: receive an intent associated with a desired formulation of a target formulated product, from a user; extract one or more functional parameters and one or more performance indicators of the desired formulation, based on the received intent; obtain a quantitative value for each functional parameter of the one or more functional parameters, using a conversion look-up table; identify one or more key input parameters associated with the one or more functional parameters of the desired formulation, based on the one or more performance indicators, wherein the one or more key input parameters include (i) one or more process parameters, (ii) one or more operating condition parameters, (iii) one or more ingredients, and (iv) one or more parameters associated with the one or more ingredients; determine an optimal prediction model for each functional parameter of the one or more functional parameters, to obtain an optimal prediction function for the associated functional parameter; and determine an optimal solution dataset of the one or more key input parameters associated with the one or more functional parameters for the desired formulation, using an optimization technique, based on an objective function, and one or more constraints comprising (i) the quantitative value for each functional parameter of the one or more functional parameters, (ii) lower bound values and upper bound values of the one or more key input parameters, and (iii) the one or more performance indicators, wherein the objective function is defined as a weighted sum of the optimal prediction function for each functional parameter of the one or more functional parameters.

In yet another aspect, there is provided a computer program product comprising a non-transitory computer readable medium having a computer readable program embodied therein, wherein the computer readable program, when executed on a computing device, causes the computing device to: receive an intent associated with a desired formulation of a target formulated product, from a user; extract one or more functional parameters and one or more performance indicators of the desired formulation, based on the received intent; obtain a quantitative value for each functional parameter of the one or more functional parameters, using a conversion look-up table; identify one or more key input parameters associated with the one or more functional parameters of the desired formulation, based on the one or more performance indicators, wherein the one or more key input parameters include (i) one or more process parameters, (ii) one or more operating condition parameters, (iii) one or more ingredients, and (iv) one or more parameters associated with the one or more ingredients; determine an optimal prediction model for each functional parameter of the one or more functional parameters, to obtain an optimal prediction function for the associated functional parameter; and determine an optimal solution dataset of the one or more key input parameters associated with the one or more functional parameters for the desired formulation, using an optimization technique, based on an objective function, and one or more constraints comprising (i) the quantitative value for each functional parameter of the one or more functional parameters, (ii) lower bound values and upper bound values of the one or more key input parameters, and (iii) the one or more performance indicators, wherein the objective function is defined as a weighted sum of the optimal prediction function for each functional parameter of the one or more functional parameters.

In an embodiment of the present disclosure, the optimal solution dataset of the one or more key input parameters associated with the one or more functional parameters of the desired formulation is displayed on visualization tools.

In an embodiment of the present disclosure, the one or more functional parameters and the one or more performance indicators of the desired formulation are extracted based on the received intent, by establishing continuous conversation with the user, using one or more conversational agents that are trained with intent-action mechanism based training dataset.

In an embodiment of the present disclosure, determining the optimal prediction model for each functional parameter of the one or more functional parameters, comprises: obtaining an input dataset associated with the one or more key input parameters and the one or more functional parameters of the desired formulation, wherein the input dataset comprises data elements for the one or more key input parameters and the one or more functional parameters; extracting a sub-input dataset of each functional parameter, from the input dataset, wherein the sub-input dataset comprises the data elements for the one or more key input parameters and the associated functional parameter; pre-processing the sub-input dataset to obtain a pre-processed dataset of each functional parameter, wherein the pre-processed dataset comprises pre-processed data elements for the one or more key input parameters and the associated functional parameter; dividing the pre-processed dataset of each functional parameter into a training dataset and a testing dataset, based on a predefined ratio; scaling the training dataset of each functional parameter to obtain a scaled training dataset; scaling the testing dataset of each functional parameter to obtain a scaled testing dataset; generating one or more prediction models of each functional parameter, using the scaled training dataset; validating the one or more generated prediction models of each functional parameter using the scaled testing dataset; determining the optimal prediction model for each functional parameter out of the one or more generated prediction models, based on the validation; and obtaining the optimal prediction function for the associated functional parameter, from the optimal prediction model.

In an embodiment of the present disclosure, pre-processing the sub-input dataset to obtain the pre-processed dataset of each functional parameter, comprises imputing missing data, outlier removal, and high correlation coefficient data removal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
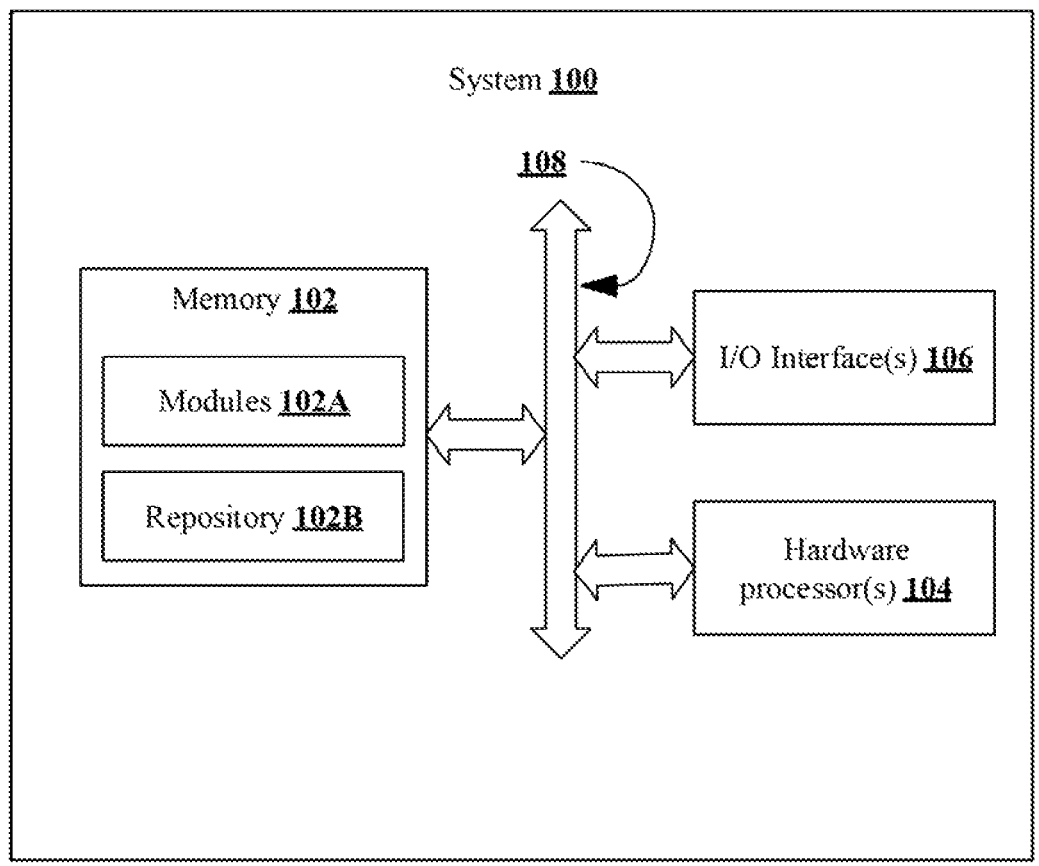
FIG. 1 illustrates an exemplary block diagram of a system for designing formulated products, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Designing formulated products, especially customized or personalized formulated products based on user requirements is a key focus area for formulated product companies to satisfy market demand. However, effective capture, analysis and assimilation of the user requirements and mapping the user requirement to extract functional requirements are limited and making such techniques and related tools are quite challenging. Further, the conventional techniques to design the personalized formulated products, based on the requirement of the user are limited, labor intensive and time consuming.

The present disclosure herein provides method and system that solve the technical problem of mapping the user requirements to extract the functional requirement and designing the customized formulated products based on the functional requirement of the user. The present disclosure receives the user requirements in the form of an intent. The functional requirements are extracted based on the user requirements, by establishing a continuous conversation with the user. An optimal prediction function for each functional requirement is determined by using a plurality of prediction models. An objective function is defined based on the optimal prediction function of each functional requirement. An optimization technique along with the objective function is employed to determine optimized solutions comprising a list of ingredients, possible composition/concentration of each ingredient, process parameters, and operating parameters for obtaining the desired formulation based on the user requirement.

Referring now to the drawings, and more particularly to FIG. 1 through FIG. 4, where similar reference characters denote corresponding features consistently throughout the figures, there are shown preferred embodiments and these embodiments are described in the context of the following exemplary systems and/or methods.

FIG. 1 illustrates an exemplary block diagram of a system 100 for designing the formulated products, in accordance with some embodiments of the present disclosure. In an embodiment, the system 100 includes or is otherwise in communication with one or more hardware processors 104, communication interface device(s) or input/output (I/O) interface(s) 106 and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware, processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computer, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102A and a repository 102B for storing data processed, received, and generated by one or more of the plurality of modules 102A. The plurality of modules 102A may include routines, programs, objects, components, data structures, and so on, which perform particular tasks or implement particular abstract data types.

The plurality oaf modules 102A may include programs or computer-readable instructions or coded instructions that supplement applications or functions performed by the system 100. The plurality of modules 102A may also be used as, signal processor(s), state machine(s), logic circuitries, and/or any other device or component that manipulates signals based on operational instructions. Further, the plurality of modules 102A can be used by hardware, by computer-readable instructions executed by the one or more hardware processors 104, or by a combination thereof. In an embodiment, the plurality of modules 102A can include various sub-modules (not shown in FIG. 1). Further, the memory 102 may include information pertaining to input(s)/output(s) of each step performed by the processor(s) 104 of the system 100 and methods of the present disclosure.

The repository 102B may include a database or a data engine. Further, the repository 102B amongst other things, may serve as a database or includes a plurality of databases for storing the data that is processed, received, or generated as a result of the execution of the plurality of modules 102A. Although the repository 102B is shown internal to the system 100, it will be noted that, in alternate embodiments, the repository 102B can also be implemented external to the system 100, where the repository 102B may be stored within an external database (riot shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102B may be distributed between the system 100 and the external database.

Figure 2:
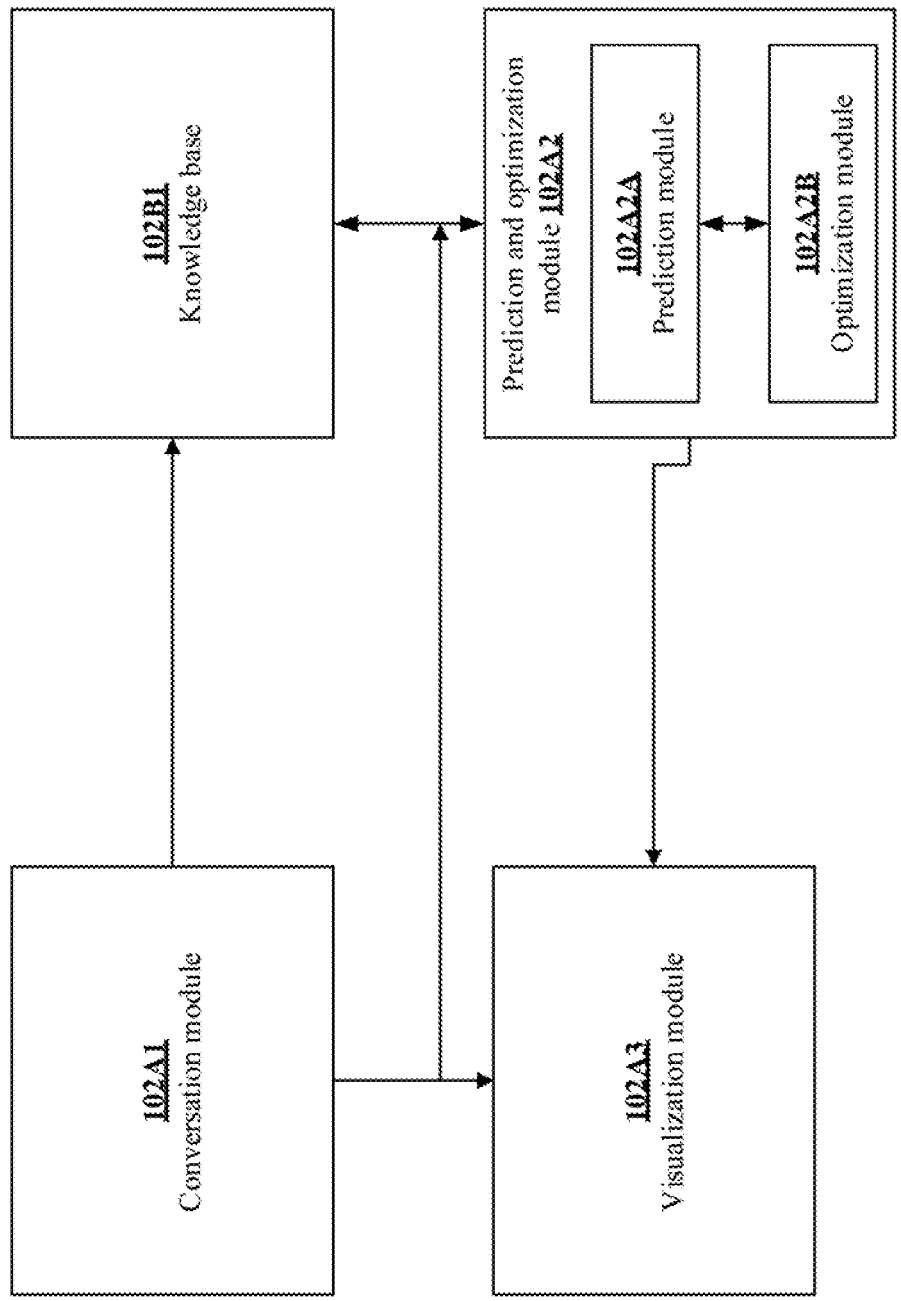
FIG. 2 is an exemplary block diagram illustrating modules of a system of FIG. 1 for designing the formulated products, in accordance with some embodiments of the present disclosure.
Figure 3A:
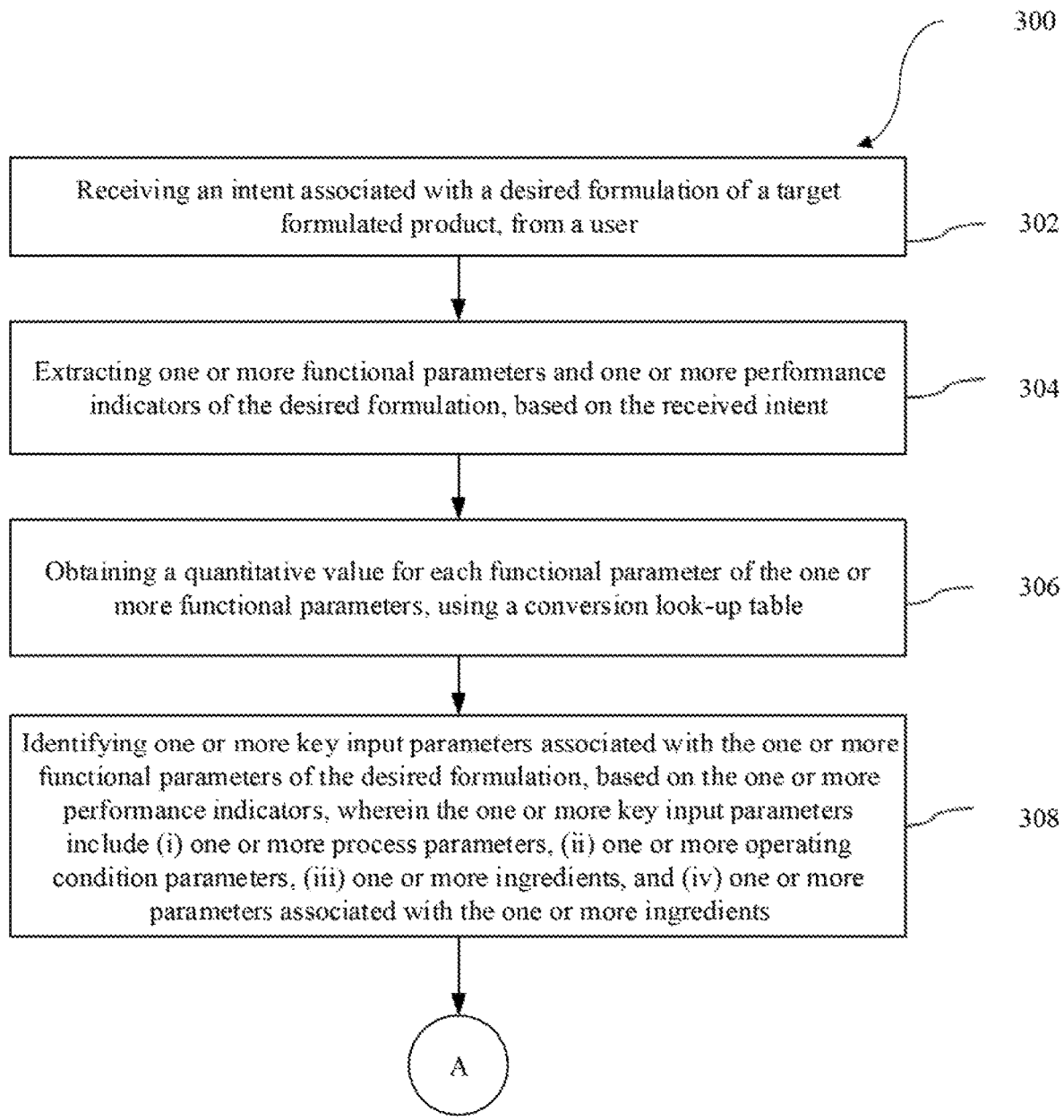
FIG. 3A and FIG. 3B illustrates exemplary flow diagrams of a processor-implemented method for designing the formulated products, in accordance with some embodiments of the present disclosure.
Figure 3B:
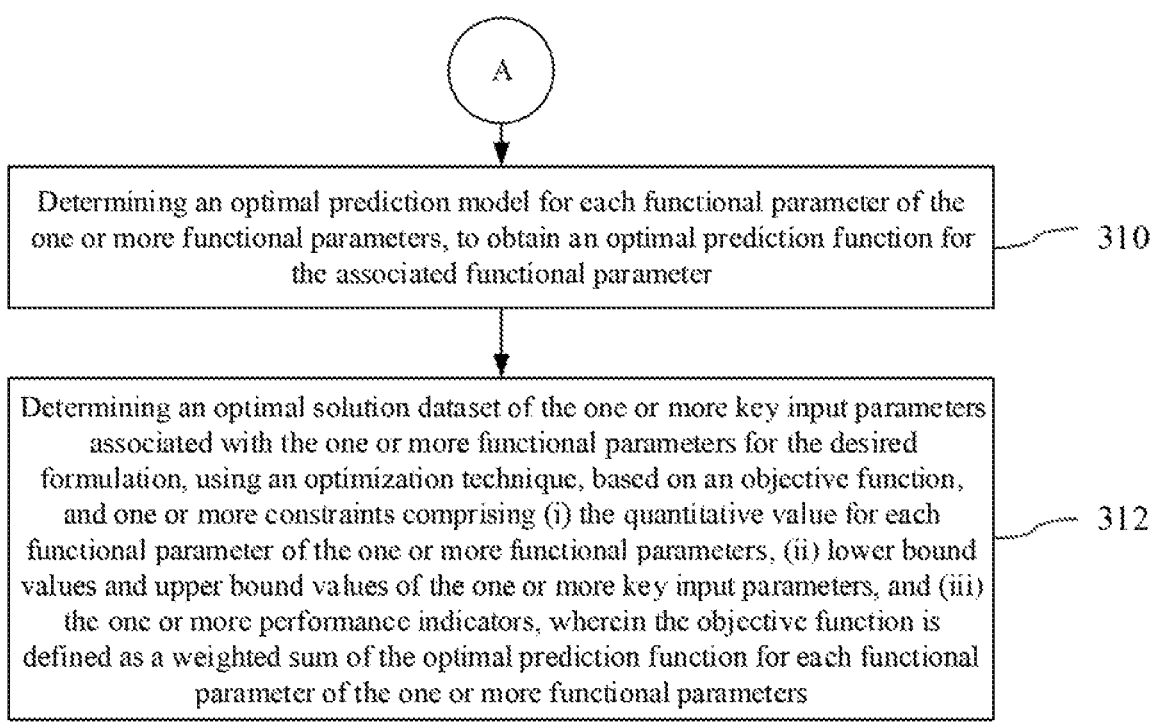

Referring collectively to FIG. 2, FIG. 3A and FIG. 3B, components and functionalities of the system 100 are described in accordance with an example embodiment of the present disclosure. For example, FIG. 2 is an exemplary block diagram illustrating modules of a system of FIG. 1 for designing the formulated products, in accordance with some embodiments of the present disclosure. As shown in FIG. 2, the modules include a conversation module 102A1, a knowledge base 102B1, a prediction and optimization module 102A2 and a visualization module 102A3. The prediction and optimization module 102A2 further include a prediction module 102A2A and an optimization module 102A2B. In an embodiment, the modules including the conversation module 102A1, the prediction and optimization module 102A2 and the visualization module 102A3 may be stored in the plurality of modules 102A comprised in the memory 102 of the system 100. In an embodiment, the knowledge base 102B1 may be stored in the repository 102B comprised in the memory 102 of the system 100.

In an embodiment, the conversation module 102A1, the prediction and optimization module 102A2, the visualization module 102A3 and the knowledge base 102B1 may be cascaded in an integrated platform for designing the formulated products.

FIG. 3A and FIG. 3B illustrates exemplary flow diagrams of a processor-implemented method 300 for designing the formulated products, in accordance with some embodiments of the present disclosure. Although steps of the method 300 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The, steps of processes described herein may be performed in any practical order. Further, some steps may be performed simultaneously, or some steps may be performed alone or independently.

At step 302 of the method 300, the one or more hardware processors 104 of the system 100 are configured to receive an intent associated with the desired formulation of a target formulated product, from a user. In an embodiment, the intent may be associated either with functional requirements of the desired formulation or with performance indicator requirements of the desired formulation, or both. In an embodiment, the performance indicator requirements may include a cost of the desired formulation, type of functional materials such as green, non-toxic or user-friendly that should be present in the desired formulation, environment friendly production process of the desired formulation, and so on. The functional requirements of the desired formulation may include the performance indicator requirements of the desired formulation. In the context of the present disclosure, the user may be an end user who require the desired formulation in the target formulated product, a design engineer or a manufacturer who wants to design or produce the desired formulation, a researcher who wants to explore more on the desired formulation, and so on.

The desired formulation may be associated with the first of ingredients, the possible composition/concentration of each ingredient, the process parameters, and the operating parameters for obtaining the desired formulation based on the user requirement. The target formulated product is the product produced with the desired formulation, based on the user requirements. The formulated products include but are not limited to home and industrial related products, personal care products, pharma products, health care products, agro products, plant protection products, coatings, inks, lubricants, adhesives, food products, and feed related products.

In an embodiment the received intent from the user may be in the form of a fuzzy statement having a question specific to the desired formulation. In an embodiment, the fuzzy statement may be a natural language statement which may be received either in the form of a text or through a speech input. For example, the intent in the form of fuzzy statement may be 'Need to avoid the problem of accumulation of dust on the solar panels', 'Need anti-scratch coating on the solar panels', 'Need super-hydrophobic, anti-scratch, and transparent coating on the solar panels', and so on.

At step 304 of the method 300, the one or more hardware processors 104 of the system 100 are configured to extract one or more functional parameters and one or more performance indicators of the desired formulation, through the conversation module 102A1, based on the received intent. The one or more functional parameters and the one or more performance indicators may contain a technical specification of the desired formulation. In an embodiment, the one or more functional parameters and the one or more performance indicators of the desired formulation are extracted based on the received intent, by establishing continuous conversation with the user. In an embodiment, one or more conversational agents such as chat-bats may be used for extracting the one or more functional parameters and the one or more performance indicators of the desired formulation. The chat-bats include text-based chat-bots and speech-input based chat-bots. The one or more conversational agents may be pre-trained with domain knowledge associated with the received intent of the user. The domain knowledge may be pre-processed in the form of intent-action mechanism and the one or more conversational agents may be trained with the intent-action mechanism based training dataset. The one or more conversational agents initiates the continuous conversation with the user, by posing a plurality of questions, a plurality of subsequent questions based on one or more previous questions associated with the intent of the user.

In an embodiment, the intent-action mechanism based training dataset may be built based on intent-action dialogue framework, where the training dataset may have column headers including {intent identification number (ID), question, action}. The intent ID may be associated with either the functional requirements of the desired formulation or with the performance indicator requirements of the desired formulation. In other words, the functional requirements may be presented in the form of one or more intent IDs, or the performance indicator requirements may be presented in the form of one or more intent IDs ($\{s_1, s_2, s_3, \ldots s_i\}$). Each intent ID may have an associated set of semantically similar questions ($X_i = \{x_1^i, x_2^i, \ldots x_m^i\}$) and the associated actions ($Y_i = \{y_1^i, y_2^i, \ldots y_m^i\}$) each having an answer to the associated question. The actions may be further directed to one or more subsequent questions and their respective answers. The one or more conversational agents may be generated by training one or more machine learning models with the intent-action mechanism based training dataset.

The one or more conversational agents takes the received intent of the user as an input and identifies one or more intent IDs associated with the intent, based on textual similarity metrics. The textual similarity metrics considers characters but not words present in the fuzzy statement of the user intent. In an embodiment, the textual similarity metrics may be obtained by using sequence-matching based algorithms. The sequence-matching based algorithms compare the sequence of the fuzzy statement of the user intent and each question from the set of semantically similar questions ($X_i = \{x_1^i, x_2^i, \ldots x_m^i\}$) and determine the associated textual similarity metrics. The one or more intent IDs having the determined textual similarity metrics more than a predefined threshold will be identified. Then, the one or more conversational agents take the associated actions ($Y_i = \{y_1^i, y_2^i, \ldots y_m^i\}$) based on the one or more intent IDs and builds the continuous conversation with the user to extract the one or more functional parameters and one or more performance indicators of the desired formulation.

An exemplary set of priority levels (represented with number of stars (*)) for the performance indicators such as the cost and toxicity are mentioned in below table A for specific ingredient that may be present in the desired formulation.

TABLE A

| Ingredient type | Cost | Toxicity |
| --- | --- | --- |
| Aerosol clear shellac | * | ** |
| Aerosol nitrocellulose/polyurethane | **** | *** |

TABLE A-continued

| Ingredient type | Cost | Toxicity |
|---|---|---|
| Aerosol precat | **** | **** |
| Aerosol water clear acrylic | *** | **** |
| Alumina | **** | ***** |
| Carbon Nanotubes | * | *** |
| Catalyzed Acrylic polyurethane | *** | *** |
| Catalyzed Modified Acrylic polyurethane | *** | *** |
| Catalyzed polyester | **** | ** |
| Catalyzed polyurethane | ** | ** |
| Conversion varnish | *** | **** |
| HDPE | * | *** |

Figure 4:
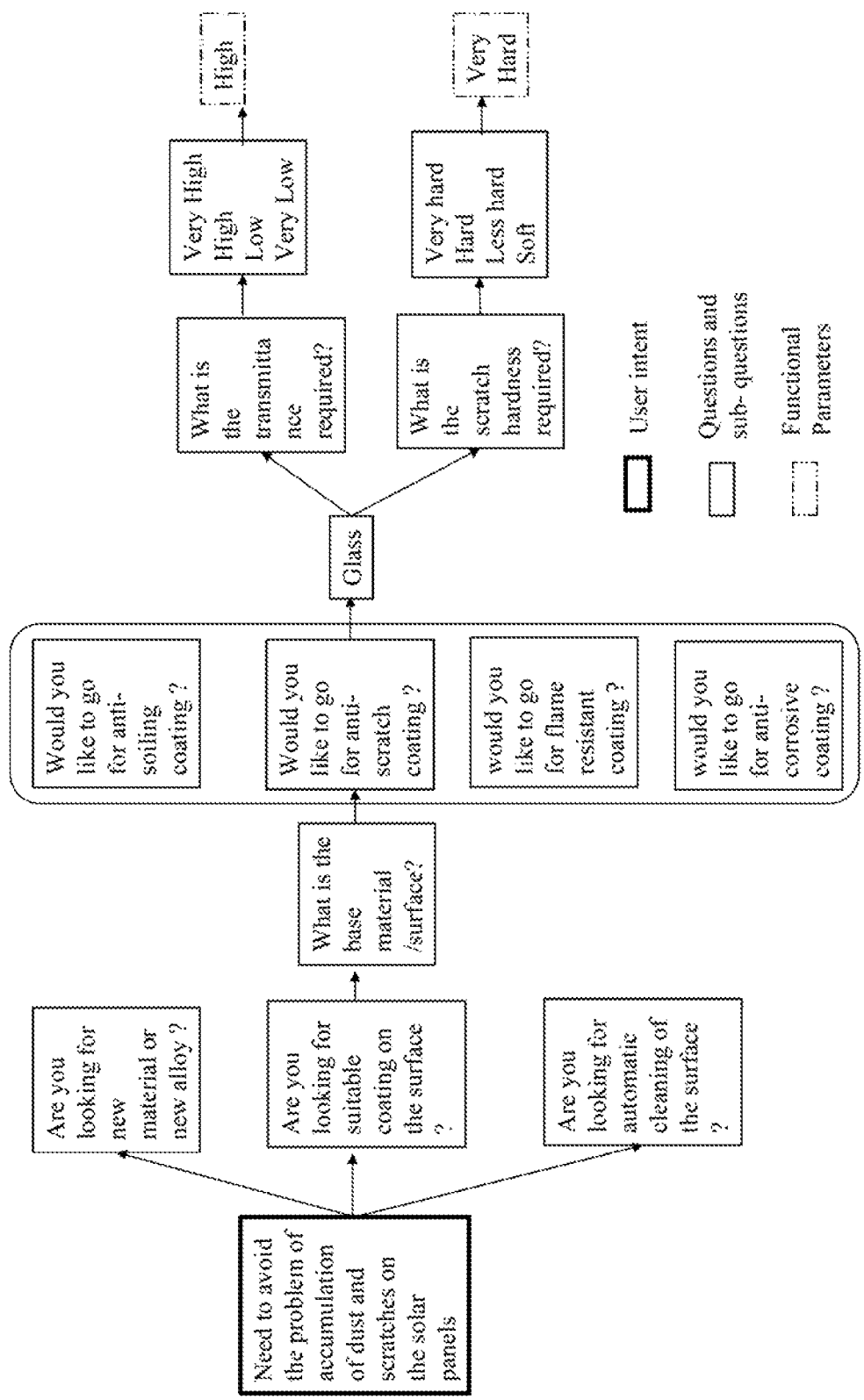
FIG. 4 is a flow diagram depicting an exemplary conversation to extract one or more functional parameters and one or more performance indicators, through an intent of a user, for designing the formulated products, in accordance with some embodiments of the present disclosure.

FIG. 4 is a flow diagram depicting an exemplary conversation to extract one or more functional parameters and one or more performance indicators, through an intent of a user, for designing the formulated products, in accordance with some embodiments of the present disclosure. The exemplary intent having the fuzzy statement of the user is: 'Need to avoid the problem of accumulation of dust and scratches on the solar panels'. If the user selects the option of anti-scratch coating in order to avoid the accumulation of dust, then the one or more conversational agents may pose sub-sequent question such as 'What is the base material/surface on which the anti-scratch coating is required?'. If the user selects a glass is a base material/surface, then the one or more conversational agents may further ask sub-sequent questions during the conversation, such as 'What is the desired level of transmittance and scratch hardness of the coated surface?'. At the end of the conversation, the one or more conversational agents may extract that the one or more functional parameters as scratch hardness ($Y_1$) and transmittance ($Y_2$), and the user need the coating to be applied on the glass surface where the desired formulation may exhibits very hard scratch hardness ($Y_1$) and high transmittance ($Y_2$). The one or more performance indicators are not present in the mentioned exemplary intent having the fuzzy statement of the user. Further, other possible one or more functional parameters may be a thickness of the coating and a durability of the coating, but the one or more functional parameters may not be needed by the user based on the received intent. The one or more functional parameters that are extracted from the conversation, may only be qualitative parameters describing the functional requirements in the desired formulation.

The knowledge base 102B1 includes a product database 102B1A (not shown in FIG. 2), a physical and chemical property database 102B1B (not shown in FIG. 2), a market standards database 102B1C (not shown in FIG. 2), a plurality of input datasets 102B1D (not shown in FIG. 2) and a conversion look-up table database 102B1E (not shown in FIG. 2). In an embodiment, the product database 102B1A includes information related to list of formulated products. The information related to list of formulated products includes one or more ingredients associated with the functional materials, along with their concentration levels (composition levels) for the formulated product. The one or more ingredients associated with the functional materials includes one or more active ingredients and one or more inactive ingredients.

The physical and chemical property database 102B1B include physical and chemical properties of each ingredient of the plurality of ingredients present in the product database 102B1A. The market standards database 102B1C comprises list of standards related to each ingredient of the plurality of ingredients present in the product database 102B1A with respective to associated physical and chemical properties present in the physical and chemical property database 102B1B. The market standards database 102B1C may also include standard operating parameters and the standard process parameters. The list of standards may be used for determining the concentration levels of the one or more ingredients required for designing the formulated product. The conversion look-up table database 102B1E includes one or more conversion look-up tables for each functional parameter of the plurality of functional parameters. The one or more conversion look-up tables may be created based on the list of standards present in the market standards database 102B1C.

Each input dataset of the plurality of input datasets 102B1D include a plurality of data elements for each of: (i) one or more process parameters (ii) one or more operating condition parameters, (iii) one or more ingredients, and (iv) one or more parameters associated with the one or more ingredients. The one or more process parameters include the parameters related to manufacturing process (for example, coating). The one or more operating condition parameters include the parameters of the operating equipment (for example coating equipment) used in the manufacturing process. The one or more ingredients are the ingredients present in the product database 102B1A. The one or more parameters associated with the one or more ingredients include the concentration level of each ingredient in the product database 102B1A and the physical and chemical properties of each ingredient present in the physical and chemical property database 102B1B. The plurality of input datasets 102B1D may be created based on the experimental results that are carried out for each functional parameters.

At step 306 of the method 300, the one or more hardware processors 104 of the system 100 are configured to obtain a quantitative value for each functional parameter of the one or more functional parameters extracted at step 304 of the method 300. The one or more qualitative functional parameters extracted at step 304 of the method 300 are to be converted to get the associated quantitative values. The quantitative value for each functional parameter may indicate a minimum permissible quantitative value of the associated functional parameter that exhibit the functional requirement in the desired formulation. The quantitative value for each functional parameter of the one or more functional parameters is obtained using the conversion look-up table present in the conversion look-up table database 102B1E.

Table 1 is an exemplary conversion look-up table showing quantitative values for the qualitative functional parameters including the scratch hardness ($Y_1$) and the transmittance ($Y_2$). The scratch hardness ($Y_1$) may be measured in gram (g) and the transmittance ($Y_2$) may be measured in percentage (%). The conversion look-up table may also include quantitative values for other qualitative functional parameters that are associated with the anti-scratch coating. The other qualitative functional parameters may be a thickness and a durability.

TABLE 1

| Functional parameter | Qualitative value | Quantitative value |
|---|---|---|
| Transmittance | Very high | >=95% |
| | High | >=90% |
| | Low | >=80% |
| | Very low | <80% |

TABLE 1-continued

| Functional parameter | Qualitative value | Quantitative value |
|---|---|---|
| Scratch hardness | Very hard | >=450 g |
|  | Hand | >=300 g |
|  | Less hard | >=200 g |
|  | Soft | <200 g |
| Thickness | Thin | <10 μm |
|  | Average | <50 μm |
|  | Thick | >50 μm |
| Durability | Very long | >24 months |
|  | Long | >12 months |
|  | Adequate | >6 months |
|  | Short | <6 months |

From the table 1, the quantitative value of very hard scratch hardness ($Y_1$) is greater than or equal to 450 g. Similarly, the quantitative value for the high transmittance ($Y_2$) is greater than or equal to 90% but lesser than or equal to 95%. Hence the desired coating formulation according to the example should have the scratch hardness ($Y_1$) greater than or equal to 450 g and the transmittance ($Y_2$) greater than or equal to 90% but lesser than or equal to 95%.

At step 308 of the method 300, the one or more hardware processors 104 of the system 100 are configured to identify one or more key input parameters associated with the one or more functional parameters of the desired formulation extracted at step 304 of the method 300. The one or more key input parameters are identified based on the one or more performance indicators extracted at step 304 of the method 300. The one or more key input parameters include (i) one or more process parameters, (ii) one or more operating condition parameters, (iii) one or more ingredients, and (iv) one or more parameters associated with the one or more ingredients The one or more process parameters include the parameters related to manufacturing process (for example, coating) to obtain the desired formulation. The one or more operating condition parameters include the parameters of the operating equipment (for example coating equipment) used in the manufacturing process to obtain the desired formulation. The one or more ingredients are the ingredients that are required for designing the desired formulation. The one or more parameters associated with the one or more ingredients include the concentration level of each ingredient and the physical and chemical properties of each ingredient that are required for designing the desired formulation.

In an embodiment, the one or more key input parameters associated with the one or more functional parameters and the one or more performance indicators of the desired formulation, may be obtained from the knowledge base 102B1. The one or more functional parameters are mapped to the product database 102B1A, the physical and chemical property database 102B1B, and the market standards database 102B1C, to identify the one or more key input parameters, based on the one or more performance indicators.

For the above mentioned exemplary functional parameters including the scratch hardness ($Y_1$) and the transmittance ($Y_2$), the one or more key input parameters identified are: refractive index of nanoparticles ($X_1$), solvent to resin ratio ($X_2$), concentration (%) of the nanoparticle ($X_3$) and a lifting speed ($X_4$). These set of identified key input parameters ($X_1$, $X_2$, $X_3$, $X_4$) may be used for designing the formulation based on the intent of the user.

At step 310 of the method 300, the one or more hardware processors 104 of the system 100 are configured to determine an optimal prediction model for each functional parameter of the one or more functional parameters through the prediction module 102A2A of the prediction and optimization module 102A2. The optimal prediction model for each functional parameter may be determined to obtain an optimal prediction function for the associated functional parameter. The optimal prediction function may define an optimal relation between the (i) the associated functional parameter and (ii) the identified key input parameters ($X_1$, $X_2$, $X_3$, $X_4$) mentioned at step 308 of the method 300.

In an embodiment, the optimal prediction model for each functional parameter may be determined by using an input dataset associated with the one or more key input parameters and the one or more functional parameters of the desired formulation. In an embodiment, the input dataset may be obtained from the plurality of input datasets 102B1D present in the knowledge base 102B1. The input dataset includes a plurality of data elements for each of the one or more key input parameters and each of the one or more functional parameters. An exemplary input dataset for the scratch hardness ($Y_1$) and the transmittance ($Y_2$), the refractive index of nanoparticles ($X_1$), the solvent to resin ratio ($X_2$), the concentration (%) of the nanoparticle ($X_3$) and the lifting speed ($X_4$) is mentioned below in table 2. The concentration (%) of the nanoparticle ($X_3$) may be measured in percentages (%) and the lifting speed ($X_4$) may be measured in rotations per minute (rpm). Each dataset of ($X_1$, $X_2$, $X_3$, $X_4$) may indicate a probable solution of the desired formulation for the associated functional parameters dataset ($Y_1$, $Y_2$). We may observe that some of the data elements are missing in the table 2.

TABLE 2

| $X_1$ | $X_2$ | $X_3$ | $X_4$ | $Y_1$ | $Y_2$ |
|---|---|---|---|---|---|
| 2.874 | 0.5 | 2 | 50 | 40 | 90.4 |
|  | 0.33 | 2 | 20 | 70 |  |
| 2.874 | 0.25 | 3 | 20 | 90 | 77.97 |
| 1.77 | 0.5 | 1 |  | 200 | 98.4 |
|  | 0.5 | 2 | 20 |  |  |
| 1.77 | 0.5 | 3 | 20 | 500 | 97.5 |
| 1.77 |  | 3 | 20 | 90 | 90.1 |
| 1.457 | 0.5 | 2 |  | 60 |  |
|  | 0.25 | 2 | 50 |  | 98.6 |
| 1.457 | 0.25 | 3 | 70 | 200 | 95.1 |

In the next step, a sub-input dataset of each functional parameter is obtained from the input dataset. The sub-input dataset of each functional parameter includes the data elements for the one or more key input parameters and the associated functional parameter. Exemplary sub-input datasets for the scratch hardness ($Y_1$) and the transmittance ($Y_2$), extracted from the exemplary input dataset are shown in table 3A and table 3B respectively.

TABLE 3A

| $X_1$ | $X_2$ | $X_3$ | $X_4$ | $Y_1$ |
|---|---|---|---|---|
| 2.874 | 0.5 | 2 | 50 | 40 |
|  | 0.33 | 2 | 20 | 70 |
| 2.874 | 0.25 | 3 | 20 | 90 |
| 1.77 | 0.5 | 1 |  | 200 |
|  | 0.5 | 2 | 20 |  |
| 1.77 | 0.5 | 3 | 20 | 500 |
| 1.77 |  | 3 | 20 | 90 |
| 1.457 | 0.5 | 2 |  | 60 |
|  | 0.25 | 2 | 50 |  |
| 1.457 | 0.25 | 3 | 70 | 200 |

TABLE 3B

| $X_1$ | $X_2$ | $X_3$ | $X_4$ | $Y_2$ |
|---|---|---|---|---|
| 2.874 | 0.5 | 2 | 50 | 90.4 |
|  | 0.33 | 2 | 20 |  |
| 2.874 | 0.25 | 3 | 20 | 77.97 |
| 1.77 | 0.5 | 1 |  | 98.4 |
|  | 0.5 | 2 | 20 |  |
| 1.77 | 0.5 | 3 | 20 | 97.5 |
| 1.77 |  | 3 | 20 | 90.1 |
| 1.457 | 0.5 | 2 |  |  |
|  | 0.25 | 2 | 50 | 98.6 |
| 1.457 | 0.25 | 3 | 70 | 95.1 |

In the next step, the sub-input dataset is pre-processed to obtain a pre-processed dataset of each functional parameter. The pre-processed dataset includes the pre-processed data elements for each of the one or more key input parameters and the associated functional parameter. The pre-processing of the sub-input dataset to obtain the pre-processed dataset of each functional parameter, includes imputing missing data, outlier removal and high correlation coefficient data removal.

In an embodiment, the missing data elements of the one or more key input parameters and the associated functional parameter are imputed using a multivariate imputation method. The multivariate imputation method predicts the missing data fields for each parameter (present in the one or more key input parameters and the associated functional parameter) at a time. The data elements of the one or more key input parameters and the associated functional parameter, that are identified as outliers may be removed. In an embodiment, either a box plot tool or a scatter plot tool may be used for the outlier removal.

If the data fields of one parameter (from the one or more key input parameters and the associated functional parameter) is highly correlated with any other parameter (from the one or more key input parameters and the associated functional parameter), then such parameter along with the associated data fields are removed in the pre-processing step. For example, if the data elements of the refractive index of nanoparticles ($X_1$) are highly correlated With the data elements of the concentration (%) of the nanoparticle ($X_3$), then the data elements of the refractive index of nanoparticles ($X_1$) are removed in the pre-processing step. In an embodiment, the pre-processing steps of imputing missing data, outlier removal and high correlation coefficient data removal, are may be performed in a sequential order. In an embodiment, some of the pre-processing steps from imputing missing data, outlier removal and high correlation coefficient data removal, may be ignored during the pre-processing.

Exemplary pre-processed dataset for the scratch hardness ($Y_1$) and the transmittance ($Y_2$), obtained after the pre-processing is shown in the below table 4A and table 4B respectively.

TABLE 4A

| $X_1$ | $X_2$ | $X_3$ | $X_4$ | $Y_1$ |
|---|---|---|---|---|
| 2.874 | 0.5 | 2 | 50 | 40 |
| 2.874 | 0.33 | 2 | 20 | 70 |
| 2.874 | 0.25 | 3 | 20 | 90 |
| 1.77 | 0.5 | 1 | 20 | 200 |
| 1.77 | 0.5 | 2 | 20 | 300 |
| 1.77 | 0.5 | 3 | 20 | 500 |
| 1.77 | 0.25 | 3 | 20 | 90 |
| 1.457 | 0.5 | 2 | 20 | 60 |

TABLE 4A-continued

| $X_1$ | $X_2$ | $X_3$ | $X_4$ | $Y_1$ |
|---|---|---|---|---|
| 1.457 | 0.25 | 2 | 50 | 100 |
| 1.457 | 0.25 | 3 | 70 | 200 |

TABLE 4B

| $X_1$ | $X_2$ | $X_3$ | $X_4$ | $Y_2$ |
|---|---|---|---|---|
| 2.874 | 0.5 | 2 | 50 | 90.4 |
| 2.874 | 0.33 | 2 | 20 | 91.3 |
| 2.874 | 0.25 | 3 | 20 | 77.97 |
| 1.77 | 0.5 | 1 | 20 | 98.4 |
| 1.77 | 0.5 | 2 | 20 | 98.9 |
| 1.77 | 0.5 | 3 | 20 | 97.5 |
| 1.77 | 0.25 | 3 | 20 | 90.1 |
| 1.457 | 0.5 | 2 | 20 | 88.2 |
| 1.457 | 0.25 | 2 | 50 | 98.6 |
| 1.457 | 0.25 | 3 | 70 | 95.1 |

The pre-processed dataset of each functional parameter obtained after the pre-processing is divided into a training dataset and a testing dataset, based on a predefined ratio. In an embodiment, the predefined ratio may be 80%:20%.

An exemplary training dataset and an exemplary testing dataset for the transmittance ($Y_2$) is shown below in table 5A and table 5B respectively. after the pre-processing.

TABLE 5A

| $X_1$ | $X_2$ | $X_3$ | $X_4$ | $Y_2$ |
|---|---|---|---|---|
| 2.874 | 0.5 | 2 | 50 | 90.4 |
| 2.874 | 0.33 | 2 | 20 | 91.3 |
| 2.874 | 0.25 | 3 | 20 | 77.97 |
| 1.77 | 0.5 | 1 | 20 | 98.4 |
| 1.77 | 0.5 | 2 | 20 | 98.9 |
| 1.77 | 0.5 | 3 | 20 | 97.5 |
| 1.77 | 0.25 | 3 | 20 | 90.1 |
| 1.457 | 0.25 | 2 | 50 | 98.6 |

TABLE 5B

| $X_1$ | $X_2$ | $X_3$ | $X_4$ | $Y_2$ |
|---|---|---|---|---|
| 1.457 | 0.5 | 2 | 20 | 88.2 |
| 1.457 | 0.25 | 3 | 70 | 95.1 |

Then, the training dataset of each functional parameter is scaled based on a scaling operation, to obtain a scaled training dataset. The scaling operation is performed by using a tool such as a preprocess tool that is available in caret library. During the scaling operation, a mean value and a standard deviation value are calculated based on data elements present each column of the training dataset. The calculated mean value will be subtracted from each data element of the associated column and the calculated standard deviation value divides each data element of the associated column to obtain the scaled training dataset.

Similarly, the testing dataset of each functional parameter is scaled based on the scaling operation as mentioned above, to obtain a scaled testing dataset. Only difference is the mean value and the standard deviation value calculated while obtaining the scaled training dataset are used in the scaling operation to obtain the scaled testing dataset.

In the next step, one or more prediction models for each functional parameter are obtained using the associated scaled training dataset. In an embodiment, a plurality of machine learning models present in the prediction module 102A2A of the prediction and optimization module 102A2 are utilized to generate the one or more prediction models for each functional parameter. In an embodiment, the plurality of machine learning models includes a plurality of classification models and a plurality of regression models. Some of the plurality of machine learning models include but are not limited to a support vector machine (SVM) model, an artificial neural network (ANN) model and a random forest (RF) model. An exemplary scaled training dataset to generate the one or more prediction models for the transmittance ($Y_2$) is shown below in table 6A, each prediction model is generated by taking ($X_1$, $X_2$, $X_3$, $X_4$) as input variables and $Y_2$ as output variable.

TABLE 6A

| $X_1$ | $X_2$ | $X_3$ | $X_4$ | $Y_2$ |
|---|---|---|---|---|
| 1.18949 | 0.91489 | −0.3536 | 1.62019 | −0.3484 |
| 1.18949 | −0.4376 | −0.3536 | −0.5401 | −0.2228 |
| 1.18949 | −1.074 | 1.06066 | −0.5401 | −2.0829 |
| −0.6116 | 0.91489 | −1.7678 | −0.5401 | 0.76804 |
| −0.6116 | 0.91489 | −0.3536 | −0.5401 | 0.83782 |
| −0.6116 | 0.91489 | 1.06066 | −0.5401 | 0.64245 |
| −0.6116 | −1.074 | 1.06066 | −0.5401 | −0.3902 |
| −1.1222 | −1.074 | −0.3536 | 1.62019 | 0.79595 |

Each prediction model of the generated one or more prediction models for each functional parameter is validated using the associated scaled testing dataset. The generated prediction model should predict the transmittance ($Y_2$) based on the scaled testing dataset during the validation. An exemplary scaled testing dataset to validate each prediction model for the transmittance ($Y_2$) is shown below in table 6B.

TABLE 6B

| $X_1$ | $X_2$ | $X_3$ | $X_4$ |
|---|---|---|---|
| −1.12219 | 0.91489 | −0.35355 | −0.54006 |
| −1.12219 | −1.07400 | 1.06066 | 3.06035 |

An exemplary scaled validation dataset after the validation is mentioned in below table 6C for the transmittance ($Y_2$).

TABLE 6C

| $X_1$ | $X_2$ | $X_3$ | $X_4$ | $Y_2$ Actual | $Y_2$ Predicted |
|---|---|---|---|---|---|
| −1.12219 | 0.91489 | −0.35355 | −0.54006 | −0.65536 | −0.20880 |
| −1.12219 | −1.07400 | 1.06066 | 3.06035 | 0.30753 | 0.76804 |

Since the exemplary scaled validation dataset is in scaled form a re-scaling operation may be performed based on the mean value and the standard deviation value calculated while obtaining the scaled training dataset to obtain the validation dataset. An exemplary validation dataset is mentioned in below table 6D.

TABLE 6D

| $X_1$ | $X_2$ | $X_3$ | $X_4$ | $Y_2$ Actual | $Y_2$ Predicted |
|---|---|---|---|---|---|
| 1.457 | 0.5 | 2 | 20 | 88.2 | 91.4 |
| 1.457 | 0.25 | 3 | 70 | 95.1 | 98.4 |

In the validation, the predicted data elements by each prediction model of the one or more prediction models are compared with the actual data elements of the associated functional parameter, using one of performance metric from the list of performance metrics to determine a performance error for the prediction model. In an embodiment, the list of performance metrics includes mean square error (MSE), root mean square error (RMSE) and mean absolute error (MAE). The prediction model having the least performance error out of the one or more prediction models is determined for each functional parameter. An optimal prediction function for each functional parameter is obtained from the optimal prediction model of the associated functional parameter. The optimal prediction function of the functional parameter indicates an optimal relation between the, associated functional parameter (for example $Y_2$) and the one or more key input parameters (for example, ($X_1$, $X_2$, $X_3$, $X_4$)). So, the optimal prediction function of each functional parameter may provide an improved solution space having an improved data elements of the associated one or more key input parameters. The optimal prediction function of each functional parameter may be represented in the form of an equation as mentioned below in general:

$$Y = F(X_1, X_2, X_3, X_4)$$

In an embodiment, the optimal prediction function of each functional parameter may be plotted in the form of charts or graphs to see further insights in the associated one or more key input parameters.

At step 312 of the method 300, the one or more hardware processors 104 of the system 100 are configured to determine an optimal solution dataset of the one or more key input parameters associated with the one or more functional parameters for the desired formulation. The optimal solution dataset is determined by using an optimization technique present in the optimization module 102A2B of the prediction and optimization module 102A2, based on an objective function. The objective function is defined as a weighted sum of the optimal prediction function for each functional parameter of the one or more functional parameters.

One or more constraints may be imposed during the optimization. The one or more constraints include (i) the quantitative value for each functional parameter of the one or more functional parameters obtained at step 306 of the method 300 (ii) lower bound values and upper bound values of the one or more key input parameters, and (iii) the one or more performance indicators that are extracted at step 304 of the method 300. The lower bound values and upper bound values of the one or more key input parameters may be obtained from the input dataset mentioned at step 310 of the method 300. The lower bound value for each key input parameters is a lowest data element of the associated key input parameter that is present in the pre-processed dataset (for example table 4A or table 4B). Similarly, the upper bound value for each key input parameters is a highest data element of the associated key input parameter that is present in the pre-processed dataset (for example table 4A or table 4B). For example, the lower bound value and the upper bound value of $X_1$ from table 4A or table 4B are 1.457 and 2.874 respectively.

In an embodiment, the objective function may be maximized or minimized during the optimization based on the intent of the user having one or more functional parameters. The objective function may be a single objective function or a multi-objective function that is decided based on the number of the functional parameters obtained at step 304 of the method 300. If the number of the functional parameters is more than one (1), then the objective function is the multi-objective function. The objective function (G) may be expressed as follows:

$$G = a_1 f_1(X_1, X_2, X_3 \ldots, X_m) + a_2 f_2(X_1, X_2, X_3 \ldots, X_m) \ldots + a_n f_n((X_1, X_2, X_3 \ldots, X_m)$$

where n indicates a number of the functional parameters, $f_1$, $f_2$, $f_3 \ldots, f_n$ indicate the optimal prediction function of each functional parameter, $X_m$ indicate number of one or more key input parameters associated with the functional parameter, and $a_1$, $a_2$, $a_3 \ldots, a_n$ indicate predefined weights of associated optimal prediction function. The predefined weights are selected based on requirement of each functional parameter, such that $a_1 + a_2 + a_3 \ldots, a_n = 1$ In an embodiment, a particle swarm optimization technique with crowd distance may be employed as the optimization technique, however the scope of the present disclosure is not limited to the particle swarm optimization technique. A skilled person in the art may exercise any similar technique in place of the particle swarm optimization technique. The particle swarm optimization technique with crowd distance may take the lower bound value as an initial value for each key input parameter and predict a set of optimal values of the associated key input parameters, based on the objective function, provided the one or more constraints are satisfied. The set of optimal values of the associated key input parameters may be in between the associated lower bound value and the associated upper bound value. In embodiment, the particle swarm optimization technique with crowd distance, may be performed either with a predefined number of iterations or the upper bound value for each key input parameter of the one or more key input parameters are met. The predefined number of iterations may be 100. The set of optimal values predicted for each of the key input parameters may form the optimal solution dataset of the one or more key input parameters associated with the one or more functional parameters for the desired formulation.

The optimal solution dataset may include a plurality of optimal datasets. Each optimal dataset (for example, ($X_1$, $X_2$, $X_3$, $X_4$)) indicates the specification of the desired formulation for the one or more functional parameters (for example. ($Y_1$, $Y_2$)) and the one or more performance indicators. An exemplary optimal solution dataset after the optimization is mentioned below in table 7;

TABLE 7

| $X_1$ | $X_2$ | $X_3$ | $X_4$ | $Y_1$ | $Y_2$ |
|---|---|---|---|---|---|
| 2.034 | 0.440 | 2.600 | 29.760 | 471.740 | 94.930 |
| 2.034 | 0.470 | 2.600 | 52.280 | 500.000 | 92.050 |
| 2.034 | 0.450 | 2.560 | 27.530 | 492.830 | 94.500 |
| 2.034 | 0.440 | 2.570 | 28.440 | 477.410 | 94.880 |

In an embodiment, the one or more hardware processors 104 of the system 100 are further configured to display the optimal solution dataset of the one or more key input parameters associated with the one or more functional parameters and the one or more performance indicators of the desired formulation, through the visualization module 102A3. The visualization module 102A3 may include a plurality of visualization tools such as multi-dimensional plot tools. The visualization tools may help in analyzing the optimal solution dataset of the one or more key input parameters further, such that the enhanced optimal solution for the desired formulation of the user may be obtained. The visualization tools may further be used for visualizing the solution space to gain better insights and interpret the results to obtain the desired formulation based on the user requirements.

In accordance with an embodiment of the present disclosure, the method and system reduces the challenges arising due to disparities in scientific terminology through the development of the continuous conversation with the user to extract functional requirement associated with the desired formulation, based on the intent of the user. This helps in reduction of time and effort involved in the product design and conceptualization phase and increases the accuracy in mapping the user requirement to the technical functional requirements.

In accordance with an embodiment of the present disclosure the method and system determine the optimal prediction model that best define the relation between the one or more functional parameters and the one or more key input parameters. Hence the optimization technique may accurately determine the optimal solution dataset having the or more key parameters including the ingredients and the associated concentration levels (compositions), the operating parameters and the process parameters, based on the functional requirements. The determined optimal solution dataset maybe effectively used to design the desired formulated products, from the vast solution space.

In accordance with an embodiment of the present disclosure, the method and system enable to capture and understand the user requirements of the desired formulation at the design phase itself. The desired functional properties of the target formulated product may be predicted in priory using the optimal prediction models by visualizing the optimal solution space. Hence designing the formulated products even with the complex formulations may be effectively achieved.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message there such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method comprising the steps of:
   receiving, via one or more hardware processors, an intent associated with a desired formulation of a target formulated product, from a user;
   extracting, via the one or more hardware, processors, one or more functional parameters and one or more performance indicators of the desired formulation, based on the received intent;
   obtaining, via the one or more hardware processors, a quantitative value for each functional parameter of the one or more functional parameters, using a conversion look-up table;
   identifying, via the one or more hardware processors, one or more key input parameters associated with the one or more functional parameters of the desired formulation, based on the one or more performance indicators, wherein the one or more key input parameters include (i) one or more process parameters, (ii) one or more operating condition parameters, (iii) one or more ingredients, and (iv) one or more parameters associated with the one or more ingredients;
   determining, via the one or more hardware processors, an optimal prediction model for each functional parameter of the one or more functional parameters, to obtain an optimal prediction function for the associated functional parameter; and
   determining, via the one or more hardware processors, an optimal solution dataset of the one or more key input parameters associated with the one or more functional parameters for the desired formulation, using an optimization technique, based on an objective function, and one or more constraints comprising (i) the quantitative value for each functional parameter of the one or more functional parameters, (ii) lower bound values and upper bound values of the one or more key input parameters, and (iii) the one or more performance indicators, wherein the objective function is defined as a weighted sum of the optimal prediction function for each functional parameter of the one or more functional parameters.

2. The method as claimed in claim 1 further comprising displaying, via the one or more hardware processors, the optimal solution dataset of the one or more key input parameters associated with the one or more functional parameters of the desired formulation, on visualization tools.

3. The method as claimed in claim 1, wherein the one or more functional parameters and the one or more performance indicators of the desired formulation are extracted based on the received intent, by establishing continuous conversation with the user, using one or more conversational agents that are trained with intent-action mechanism based training dataset.

4. The method as claimed in claim 1, wherein determining the optimal prediction model for each functional parameter of the one or more functional parameters, comprises:
   obtaining an input dataset associated with the one or more key input parameters and the one or more functional parameters of the desired formulation, wherein the input dataset comprises data elements for the one or more key input parameters and the one or more functional parameters;
   extracting a sub-input dataset of each functional parameter, from the input dataset, wherein the sub-input dataset comprises the data elements for the one or more key input parameters and the associated functional parameter;
   pre-processing the sub-input dataset to obtain a pre-processed dataset of each functional parameter, wherein the pre-processed dataset comprises pre-processed data elements for the one or more key input parameters and the associated functional parameter;
   dividing the pre-processed dataset of each functional parameter into a training dataset and a testing dataset, based on a predefined ratio;

scaling the training dataset of each functional parameter to obtain a scaled training dataset;
scaling the testing dataset of each functional parameter to obtain a scaled testing dataset;
generating one or more prediction models of each functional parameter, using the scaled training dataset;
validating the one or more generated prediction models of each functional parameter using the scaled testing dataset;
determining the optimal prediction model for each functional parameter out of the one or more generated prediction models, based on the validation; and
obtaining the optimal prediction function for the associated functional parameter, from the optimal prediction model.

5. The method as claimed in claim 4, wherein preprocessing the sub-input dataset to obtain the pre-processed dataset of each functional parameter, comprises imputing missing data, outlier removal, and high correlation coefficient data removal.

6. A system comprising:
a memory storing instructions;
one or more Input/Output (I/O) interfaces; and
one or more hardware processors coupled to the memory via the one or more I/O interfaces, wherein the one or more hardware processors are configured by the instructions to:
receive an intent associated with a desired formulation of a target formulated product, from a user;
extract one or more functional parameters and one or more performance indicators of the desired formulation, based on the received intent;
obtain a quantitative value for each functional parameter of the on or more functional parameters, using a conversion look-up table;
identify one or more key input parameters associated with the one or more functional parameters of the desired formulation, based on the one or more performance indicators, wherein the one or more key input parameters include (i) one or more process parameters, (ii) one or more operating condition parameters, (iii) one or more ingredients, and (iv) one or more parameters associated with the one or more ingredients;
determine an optimal prediction model for each functional parameter of the one or more functional parameters, to obtain an optimal prediction function for the associated functional parameter; and
determine an optimal solution dataset of the one or more key input parameters associated with the one or more functional parameters for the desired formulation, using an optimization technique, based on an objective function, and one or more constraints comprising (i) the quantitative value for each functional parameter of the one or more functional parameters, (ii) lower bound values and upper bound values of the one or more key input parameters, and (iii) the one or more performance indicators, wherein the objective function is defined as a weighted sum of the optimal prediction function for each functional parameter of the one or more functional parameters.

7. The system as claimed in claim 6, wherein the one or more hardware processors are further configured to display the optimal solution dataset of the one or more key input parameters associated with the one or more functional parameters of the desired formulation, on visualization tools.

8. The system as claimed in claim 6, wherein the one or more hardware processors are further configured to extract the one or more functional parameters and the one or more performance indicators of the desired formulation, by establishing continuous conversation with the user, based on the received intent, using one or more conversational agents that are trained with intent-action mechanism based training dataset.

9. The system as claimed in claim 6, wherein the one or more hardware processors are further configured to determine the optimal prediction model for each functional parameter of the one or more functional parameters, by;
obtaining an input dataset associated with the one or more key input parameters and the one or more functional parameters of the desired formulation, wherein the input dataset comprises data elements for the one or more key input parameters and the one or more functional parameters;
extracting a sub-input dataset of each functional parameter, from the input dataset, wherein the sub-input dataset comprises the data elements for the one or more key input parameters and the associated functional parameter;
pre-processing the sub-input dataset to obtain a pre-processed dataset of each functional parameter, wherein the pre-processed dataset comprises pre-processed data elements for the one or more key input parameters and the associated functional parameter;
dividing the pre-processed dataset of each functional parameter into a training dataset and a testing dataset, based on a predefined ratio;
scaling the training dataset of each functional parameter to obtain a scaled training dataset;
scaling the testing dataset of each functional parameter to obtain a scaled testing dataset;
generating one or more prediction models of each functional parameter, using the scaled training dataset;
validating the one or more generated prediction models of each functional parameter using the scaled testing dataset;
determining the optimal prediction model for each functional parameter out of the one or more generated prediction models, based on the validation; and
obtaining the optimal prediction function for the associated functional parameter, from the optimal prediction model.

10. The system, as claimed in claim 9, wherein pre-processing the sub-input dataset to obtain the pre-processed dataset of each functional parameter, comprises imputing missing data, outlier removal, and high correlation coefficient data removal.

11. A computer program product comprising a non-transitory computer readable medium having a computer readable program embodied therein, wherein the computer readable program, when executed on a computing device, causes the computing device to:
receive an intent associated with a desired formulation of a target formulated product, from a user;
extract one or more functional parameters and one or more performance indicators of the desired formulation, based on the received intent;
obtain a quantitative value for each functional parameter of the one or more functional parameters, using a conversion look-up table;
identify one or more key input parameters associated with the one or more functional parameters of the desired formulation, based on the one or more performance indicators, wherein the one or more key input parameters include (i) one or more process parameters, (ii) one or more operating condition parameters, (iii) one or more ingredients, and (iv) one or more parameters associated with the one or more ingredients;
determine an optimal prediction model for each functional parameter of the one or more functional parameters, to obtain an optimal prediction function for the associated functional parameter; and determine an optimal solution dataset of the one or more key input parameters associated with the one or more functional parameters for the desired formulation, using an optimization technique, based on an objective function, and one or more constraints comprising (i) the quantitative value for each functional parameter of the one or more functional parameters, (ii) lower bound values and upper bound values of the one or more key input parameters, and (iii) the one or more performance indicators, wherein the objective function is defined as a weighted sum of the optimal prediction function for each functional parameter of the one or more functional parameters.

* * * * *